(12) United States Patent
Bougard

(10) Patent No.: US 8,140,023 B2
(45) Date of Patent: Mar. 20, 2012

(54) SYSTEM AND METHOD FOR COMMUNICATION WITH ADAPTIVE LINK CONTROL

(75) Inventor: Bruno Bougard, Jodoigne (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 676 days.

(21) Appl. No.: 11/725,976

(22) Filed: Mar. 20, 2007

(65) Prior Publication Data

US 2007/0254608 A1   Nov. 1, 2007

(30) Foreign Application Priority Data

Mar. 23, 2006   (EP) .................................... 06447041

(51) Int. Cl.
*H04B 1/04* (2006.01)
*H04B 7/02* (2006.01)
(52) U.S. Cl. ............................ 455/68; 455/101; 455/103
(58) Field of Classification Search ............... 455/426.1, 455/450, 451, 452.1, 452.2, 550.1, 552.1, 455/561, 562.1, 101, 102, 103, 132, 272, 455/39, 68, 69, 70; 370/329, 338
See application file for complete search history.

(56) References Cited

U.S. PATENT DOCUMENTS

| | | | |
|---|---|---|---|
| 7,301,924 B1 * | 11/2007 | Gurbuz et al. ................. | 370/335 |
| 7,493,092 B2 * | 2/2009 | Shida et al. ................... | 455/103 |
| 2002/0193146 A1 | 12/2002 | Wallace et al. | |
| 2003/0162519 A1 * | 8/2003 | Smith et al. ................. | 455/277.1 |
| 2006/0046662 A1 | 3/2006 | Moulsley et al. | |
| 2006/0067263 A1 * | 3/2006 | Li et al. ......................... | 370/315 |
| 2006/0141968 A1 * | 6/2006 | Masaki ......................... | 455/272 |

FOREIGN PATENT DOCUMENTS

EP    1 187 506 A1    3/2002

OTHER PUBLICATIONS

European Search Report dated Sep. 1, 2006 for European Patent Application No. 06447041.2.

* cited by examiner

*Primary Examiner* — Nguyen Vo

(74) *Attorney, Agent, or Firm* — Knobbe Martens Olson & Bear LLP

(57) ABSTRACT

One inventive aspect relates to a system and method for performing communication between a transmitting device and a receiving device along a communication path. The transmit device and the receive device each have at least one antenna. At least one of the devices has a plurality of antennas. The method comprises determining first information about the communication path. The method further comprises determining second information about the desired performance parameters of the communication. The method further comprises selecting based on the first and second information a mode of communication from a predetermined set of communication modes. The set includes a Single Input Single Output (SISO) and at least one Multiple Input Multiple Output (MIMO) communication scheme. The method further comprises performing communication in accordance with the selected mode.

21 Claims, 7 Drawing Sheets

SYSTEM AND METHOD FOR COMMUNICATION WITH ADAPTIVE LINK CONTROL

BACKGROUND OF THE INVENTION

1. Field of the Invention

The present invention relates to the field of systems and methods for communication wherein some degree of adaptive link control is provided.

2. Description of the Related Technology

The use of multiple-antenna transmission techniques can drastically improve the performance of wireless communication systems. More specifically, such techniques can be used to increase antenna gain and directionality (e.g., beamforming), to improve link robustness (e.g., space-time coding) or to improve spectrum efficiency (e.g. space division multiplexing).

Techniques where multiple antennas are considered both at transmit and receive sides can combine those assets and are referred to as MIMO (multiple-input, multiple-output). On the other hand, because of its robustness in harsh frequency selective channel combined with a low implementation cost, orthogonal frequency division multiplexing (OFDM) is now pervasive in broadband wireless communication. Therefore, MIMO-OFDM schemes turn out to be excellent candidates for next generation broadband wireless standards (like e.g. IEEE802.11n).

Traditionally, the benefit of MIMO schemes is characterized in terms of multiplexing gain (i.e. the increase in spectrum efficiency) and diversity gain (namely, the increase in channel variation immunity, quantified as the order of the bit error rate decay as a function of the signal-to-noise ratio (SNR)). Given a multiple-input, multiple-output (MIMO) channel and assuming a high SNR, there exists a fundamental trade-off between how much of these gains a given coding scheme can extract. The merit of a new multiple-antenna scheme is then mostly evaluated with regard to that trade-off. However, due to the recent trend towards having broadband wireless support in small form-factor, potentially multi-mode, battery-powered devices, such as personal digital assistants (PDAs) and smartphones, the energy efficiency is an increasingly important aspect to take into account when assessing a new scheme. Characterizing how diversity gain, multiplexing gain and/or coding gain influence the user-relevant trade-off between transmission rate and energy efficiency trade-off is not trivial.

Transceivers' power consumption is generally speaking made of two terms. The first term corresponds to the power amplifier and depends on the transmit power, hence on the link budget. The second term corresponds to the other electronics power consumption and is independent of the link budget. This is further referred to as dynamic and static power consumption, respectively. The impact of multiple-antenna transmission (MIMO), when compared with traditional single-antenna (SISO) transmission, is two-fold. On the one hand, the general benefit in spectral efficiency versus SNR can be exploited either to reduce the required transmit power, with impact on the dynamic power consumption, or to reduce the transceiver duty cycle with impact on both dynamic and static power contributions. On the other hand, the presence of multiple antennas requires duplicating a part of the transceiver circuitry, which increases both the static and dynamic terms. The question whether multiple-antenna techniques increase or decrease the energy efficiency in this context has only very recently been addressed in the literature.

Based on comprehensive first order energy and performance models of sensor-targeted transceivers, taking both static and dynamic power into account, the energy efficiency of single-carrier Space-Time Block Coded (STBC) MIMO links versus traditional single antenna (SISO) links has been evaluated. Interestingly, it is shown that in short-/middle-range applications such as sensor networks—and by extension, WLAN—non-adaptive multiple-antenna techniques actually degrade the energy efficiency at a same rate. However, when combined with adaptive modulation in so-called adaptive multiple-antenna techniques, the energy-efficiency can be improved. Energy-efficiency can further be improved by adaptively combining multiplexing and diversity. Adaptivity is hence mandatory to achieve high-performance and energy-efficient transmission.

Adaptive MIMO-OFDM schemes have also been studied in the context of broadband communication. A scheme is proposed to switch between diversity and multiplexing codes based on limited channel state information (CSI) feedback. Adaptation is carried out to minimize the bit error probability (BER). Pragmatic coarse grain adaptation schemes have been evaluated. Modulation, forward error correction (FEC) coding rate and MIMO encoding are adaptable according to a CSI estimator—specifically, the average signal-to-noise ratio (SNR) and packet error rate (PER)—in order to maximize the effective throughput. More recently, fine grain adaptation schemes, tuning carrier-per-carrier the modulation and MIMO encoding, have been proposed. The main challenge with such schemes is to provide the required CSI to the transmitter with minimal overhead. Yet, in none of the prior art contributions energy-efficiency is considered. More specifically, the static power consumption is never considered in the optimization although it can be shown to be of great importance. Moreover, adaptation policies have been designed to maximize gross data rate and/or minimize (uncoded) bit error rate without taking into account the medium access control (MAC) aspects that have been shown to be of significant importance both for the net throughput and for the energy efficiency.

SUMMARY OF VARIOUS INVENTIVE ASPECTS

The system, method, and devices of the invention each have several aspects, no single one of which is solely responsible for its desirable attributes. Without limiting the scope of this invention, its more prominent features will now be briefly discussed.

Certain inventive aspects aim to provide a method for communication with adaptive link control in order to enhance the energy-efficiency of the communication. One inventive aspect relates to a method for performing communication between a transmitting device and a receiving device along a communication path. The transmit device and the receive device each have at least one antenna. At least one of the devices has a plurality of antennas. The method comprises:
 determining first information about the communication path,
 determining second information about the desired performance parameters of the communication,
 selecting based on the first and second information a mode of communication from a predetermined set of communication modes, the set including a single input single output (SISO) and at least one multiple input multiple output (MIMO) communication scheme,
 exchanging information about the selected mode of communication between the transmitting and receiving device about the determined mode, performing communication in accordance with the selected mode.

Preferably the selecting of a mode is performed on a subset of the predetermined set, whereby the subset has been preselected as a function of the first and second information.

Advantageously the predetermined set includes at least two MIMO communication schemes. The at least two MIMO communication schemes comprise a spatial division multiplexing scheme and a space-time block coding scheme.

In an embodiment the communication is wireless.

The selection of a mode of communication is preferably performed on a packet per packet basis.

In another embodiment after the process of exchanging information about the selected mode a process is performed of configuring the transmission device and the receiving device according to the selected mode. The process of configuring is advantageously performed in a SISO communication mode.

The first information about the communication path preferably comprises the average path loss.

In another aspect the second information comprises information about the energy consumption of the transmit device and/or the receive device. The second information may also comprise data about the net data transmit rate (i.e. the goodput).

The information about the selected mode preferably comprises the number of antennas of the transmit device and/or of the receive device. The information about the selected mode may further comprise data about whether or not a MIMO mode is selected.

In another aspect, there is a system for performing communication between a transmitting device and a receiving device along a communication path. The transmit device and the receive device have each at least one antenna. At least one of the devices has a plurality of antennas. The system comprises means for determining first information about the communication path by using a capacity indicator capable of computing an instantaneous capacity. The system further comprises means for determining second information about the desired performance parameters of the communication. The system further comprises means for selecting based on the first and second information a mode of communication from a predetermined set of communication modes in order to enhance the energy efficiency of communication, the set comprising a Single Input Single Output (SISO) and at least one Multiple Input Multiple Output (MIMO) communication scheme. The system further comprises means for exchanging information about the selected mode of communication between the transmitting and receiving device about the determined mode. The system further comprises means for performing communication in accordance with the selected mode.

DETAILED DESCRIPTION OF CERTAIN INVENTIVE EMBODIMENTS

Figure 1:
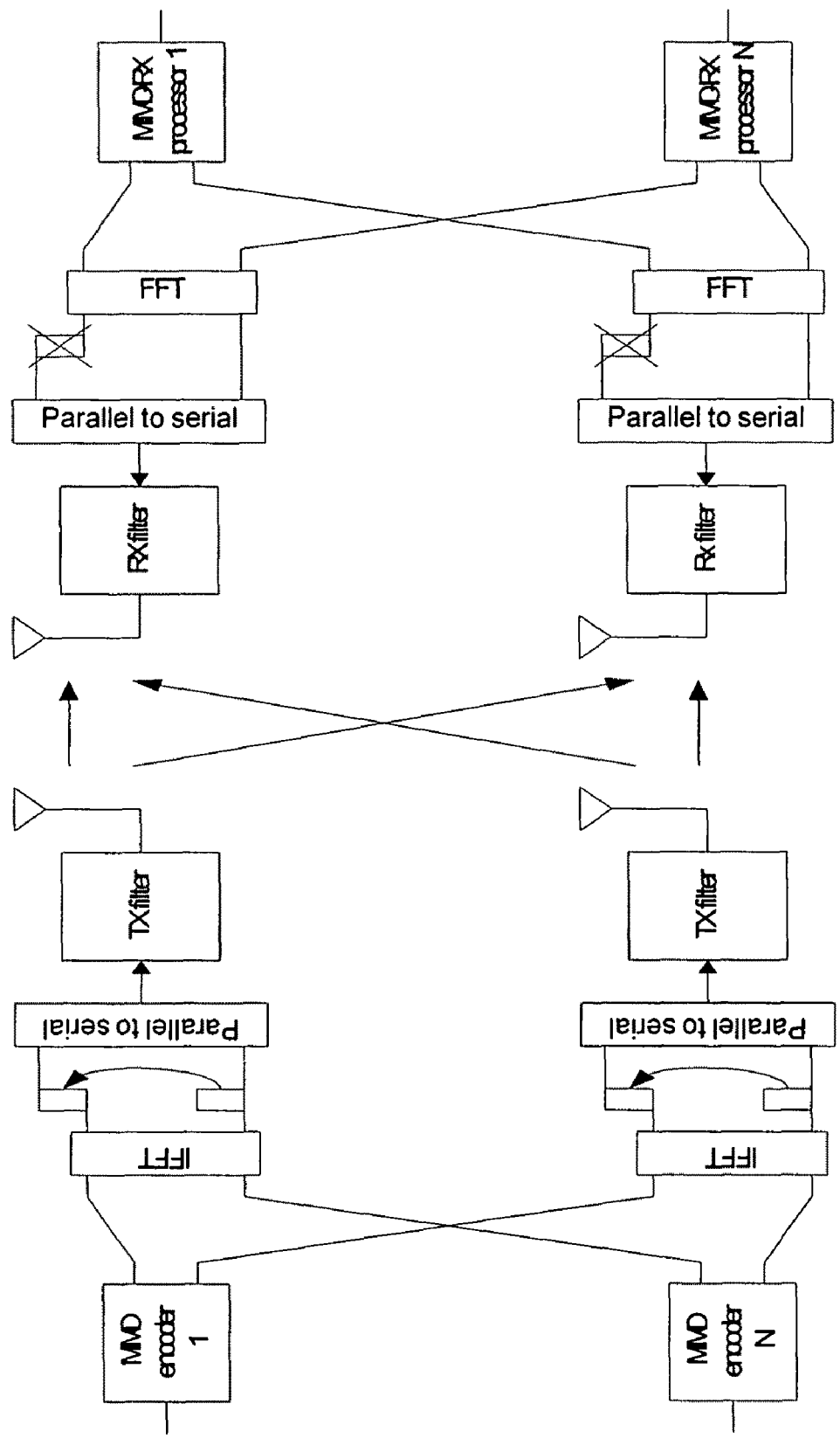
FIG. 1 represents the general set-up for the considered MIMO schemes.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

First the energy-efficiency is investigated of two MIMO-OFDM schemes, namely a per-carrier space-time block coded (STBC) scheme and a space-division multiplexing scheme (SDM-RX), each combined with OFDM so that multiple-antenna encoding and/or receive processing is performed on a per-carrier basis. Both schemes can be implemented on top of a legacy orthogonal frequency division multiplexing (OFDM) transmission chain as used in IEEE 802.11a/g/n and proceed to spatial processing at the receiver only. The IEEE 802.11 MAC is adapted to accommodate those modes.

The N OFDM carriers are QAM-modulated with a constellation size set by some link adaptation policy. The same constellation is considered for the different carriers of a given symbol, therefore it is referred to as 'coarse grain' adaptation, as opposed to fine grain adaptation whereby the various sub-carriers can carry different constellations.

FIG. 1 illustrates a general set-up for MIMO-OFDM on which either SDM or STBC can be implemented. For SDM processing, the multiple-antenna pre-processing reduces to demultiplexing the input stream in substreams that are transmitted in parallel. Vertical encoding is considered: the original bit stream is FEC encoded, interleaved and demultiplexed between the OFDM modulators. The MIMO processors at the receiver side take care of the required spatial interference mitigation on a per sub-carrier basis. A minimum mean-square error (MMSE) detection scheme is considered. Although the MMSE algorithm is outperformed by a non-linear receiving algorithm such as successive interference cancellation, its implementation ease keeps it attractive in low cost high throughput solution such as wireless local area networks.

The STBC mode uses space-time block codes from orthogonal designs in a 2×2 configuration. Such a scheme reduces to an equivalent diagonal system that can be interpreted as a SISO model wherein the channel is the square root of the average of the squared MIMO sub-channels.

Channel encoding and OFDM modulation are performed according to the IEEE 802.11a standard specifications.

Figure 2:
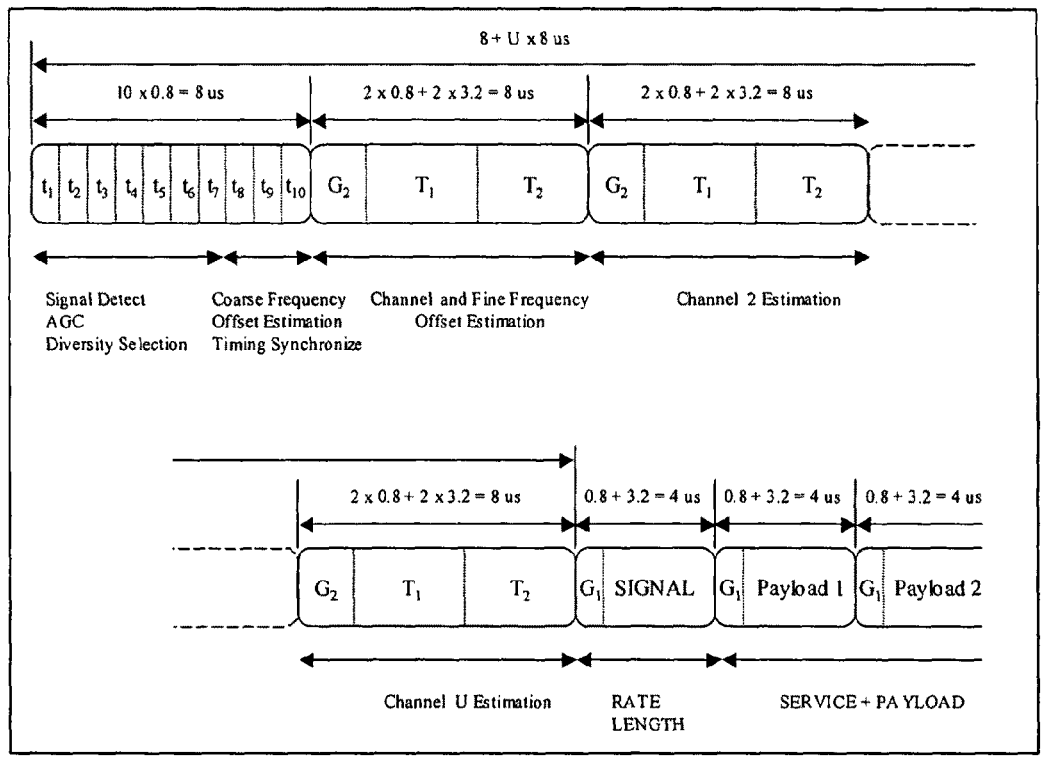
FIG. 2 represents the preamble structure.

The multiple-antenna Medium Access Control (MAC) protocol is a direct extension of the IEEE 802.11 distributed coordination function (DCF) standard. A CSMA (carrier-sense multiple access) medium access procedure performs automatic medium access sharing. Collision avoidance is implemented by means of the exchange of request-to-send (RTS) and clear-to-send (CTS) frames. The standard 802.11 MAC can easily be tuned for adaptive multiple-antenna systems. The basic behavior of each terminal is assumed to be single-antenna transmission. Consequently, single-antenna exchange establishes the multi-antenna features prior to the MIMO exchange. This is made possible via the RTS/CTS mechanism and the data header. A signaling relative to the multiple-antenna mode is added to the PLCP (Physical Layer Convergence Protocol) header. Further, the transactions required for channel estimation need to be adapted. Indeed, not only one, but four channel paths must be identified when considering a 2×2 configuration. Therefore the preamble structure is adapted as shown in FIG. 2. The transmitter sends preambles consecutively on antenna 1 and 2. The receiver can then identify all channel paths.

The physical and medium access layers being defined, performance and energy models can be established in order to analyze the energy efficiency versus throughput trade-off. The goal is to compute, on the one hand, the net throughput— i.e. the effective data rate on top of the data link layer—and, on the other hand, the energy per transmitted data bit as a function of the channel state and average signal to noise ratio (SNR) (or equivalently transmitted power if the path loss is known). The net throughput depends on the gross throughput provided by the physical layer, the packet error rate (PER) and the whole overhead introduced by the medium access control layer. The energy per bit depends on the transmit power, the power amplifier inefficiency, the transmitter electronics overhead and the duty-cycle.

An important aspect is to identify tractable channel state parameters that dominate the packet error behavior. In traditional link adaptation, considering narrow-band links affected by Rayleigh fading, the SNR suffices to track the channel state. In MIMO-OFDM however, the impact of the channel on the PER performance is more complex. In spatial multiplexing, for instance, for a given modulation and SNR, the PER performance still depends on the rank of the channel. The situation is made even more complex by the fact that not all carriers experience the same MIMO channel. Also, it is well-known that a channel instance can be good for a specific MIMO coding while it is bad for another. Possible CSI indicators have been proposed and an empirical approach based on multiple statistic of the post-processing SNR (the SNR after MIMO processing) and running-average PER monitoring is proposed. Yet, it is hard to consistently define a post-processing SNR for different MIMO schemes. Also, relying on PER information introduces a trade-off between accuracy and adaptation feedback latency, both having a potential impact on stability.

Both energy efficiency and net throughput are actually weak functions of the PER. Simplified channel indicators based on the correlation of the PER and the instantaneous capacity can be determined. Performance and energy models based on those indicators can then further be derived. The presented models are partly based on simulation of the physical layer as introduced previously, considering the channel model of the IEEE 802.11n standard.

First, assuming that noise and distortion affect the receiver performance in a similar way, the signal to noise and distortion at the receiver input ($SiNAD_{Rx}$) can be related to the packet error rate (PER). This relation is established in a two-step semi-empirical way.

Step 1: Based on the knowledge of the SiNAD and of the current MIMO-OFDM channel instance (H), a so-called capacity indicator is computed. The latter is defined as the instantaneous capacity of the compound channel composed of the transmission channel (H) followed by the MIMO-RX processor. The rationale is that, provided that the channel can be assumed as quasi-static during the transmission of one packet, the block error probability (BlER) of the forward error correction code—and hence the PER—can be related to the aforementioned instantaneous capacity without direct dependency on the SiNAD and the channel response (H).

Figure 3:
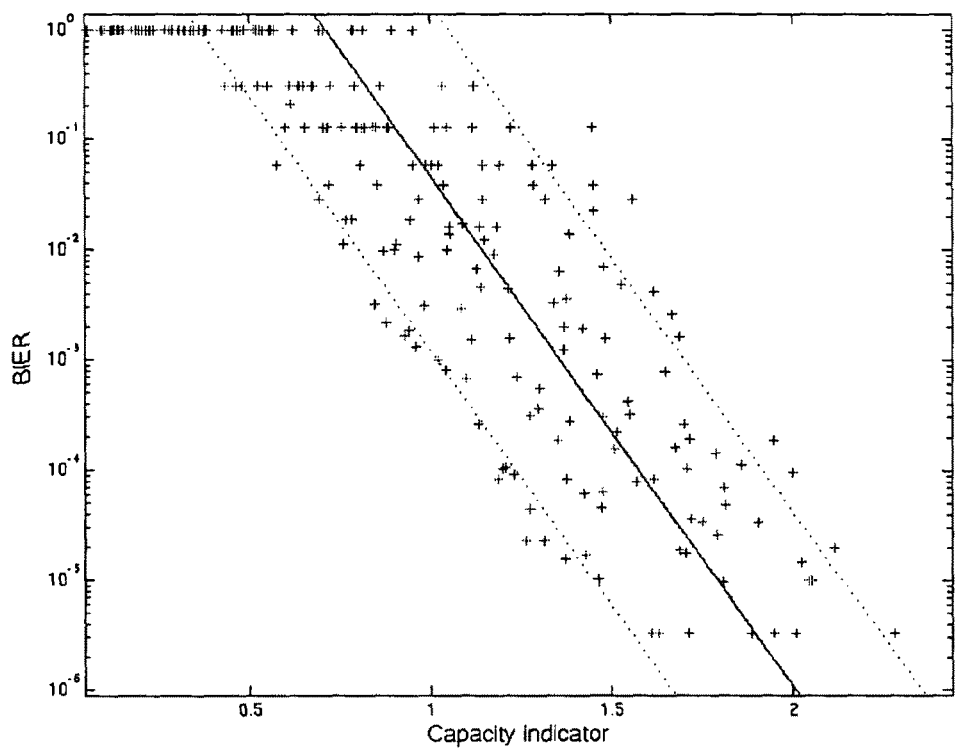
FIG. 3 represents the block error rate as a function of the capacity indicator for SISO, QPSK and code rate ½.

Step 2: The values of the capacity indicator are correlated with the BlER. Results obtained by Monte-Carlo simulation for a single-antenna QPSK rate-½ transmission are depicted in FIG. 3. Simulations are carried out for an extensive set of channel realizations and a wide range of SNRs. A strong correlation can be observed. All simulation points are within a range of ±0.5/s/Hz from the average BlER versus capacity curve obtained by linear regression in the horizontal direction. It can also be noted that the regression curve is vanishing at a rate of four decades per 1 bit/s/Hz in capacity. Conversely, one can state that the required capacity is a weak function of the targeted BlER and, by extension, of the PER. Therefore, a simple model suffices wherein the PER is assumed to be equal to 1 if the actual value of the capacity indicator is lower than the spectral efficiency $\eta$—i.e. MIMO and signaling modes—, plus an empirical safety margin $\delta$, and 0 otherwise. From FIG. 3, one can see that if the actual capacity indicator is 1 units above the spectral efficiency, the block error rate is lower than $10^{-6}$, which corresponds to a PER<1% and, hence, average rate and energy penalties<1% as compared to an error-free transmission. So that $\delta$ is set equal to 1. In the following, the expression of the capacity indicator is derived in the case of SISO-OFDM, STBC-OFDM and SDM-OFDM. Based thereon, a discrete-state performance model is established.

Capacity Indicator for SISO-OFDM

Let $H=(h^n_{ua})$ be a MIMO-OFDM channel realization. The coefficient $h^n_{11}$ corresponds to the (flat) channel response between the single active transmit antenna and the single active receive antenna for the sub-carrier n (including transmit and receive filters). Assuming that distortion and noise affect the receiver in a similar way, the signal to noise ratio (SNR) to be considered is equal to the aforementioned $SiNAD_{Rx}$. The capacity indicator is given by (Eq. 1), where W is the signal bandwidth and N the number of subcarriers. If the SNR is high compared to 1, the capacity C relative to the bandwidth W (actually, the maximum achievable spectrum efficiency) can be decomposed in a first term proportional to the SNR and independent of H and a second term function of H only (Eq. 2). This observation will be used further to establish the discrete channel model.

$$C = W \cdot \frac{1}{N} \sum_{n=1}^{N} \log_2(1 + h_{11}^{n^2} SNR) \quad \text{(Eq. 1)}$$

$$\frac{C}{W} \cong \frac{SNR|_{dB}}{10\log_{10} 2} + \frac{1}{N} \sum_{n=1}^{N} \log_2(h_{11}^{n^2}) \quad \text{(Eq. 2)}$$

Capacity Indicator for STBC-OFDM

As previously mentioned a STBC link on a MIMO channel can be reduced to a simple SISO chain seeing a channel corresponding to the square root of the average of the squared sub-channels between each pair of transmit and receive antennas. The capacity indicator can hence be computed just as for SISO:

$$\frac{C}{W} \cong \frac{SNR|_{dB}}{10\log 2} + \frac{1}{N} \sum_{n=1}^{N} \log_2\left(\frac{1}{UA} \sum_{u=1}^{U} \sum_{a=1}^{A} h_{ua}^{n^2}\right) \quad \text{(Eq. 3)}$$

Capacity Indicator for SDM-OFDM

In the SDM-OFDM case, the compound channel results from the concatenation of the transmission channel with the interference cancellation filter. The capacity indicator can be computed based on the post-processing SNRs—i.e., the signal to noise and interference ratio for each stream at the interference cancellation filter output. In the sequel, $H^n$ and $F^n$ denote the MIMO channel realization for the sub-carrier n, and the corresponding MMSE filter, respectively (Eq. 4).

$$F^n = H^{n^H} \cdot (H^n H^{n^H} + \sigma^2 I_{A \times A})^{-} \quad \text{(Eq. 4)}$$

In the 2×2 case, assume an equal transmit power at both transmit antennas $P_1 = P_2 = P/2$. The first row, second row, first column, second column of the matrices $H^n$ and $F^n$ are denoted $f^n_1, f^n_2, h^n_1, h^n_2$, respectively. The sub-stream post-processing SNRs $\gamma_1$ and $\gamma_2$ can then be computed as:

$$\gamma_1^n = \frac{|f_1^n h_1^n|^2 \times P_1}{|f_1^n h_2^n|^2 \times P_2 + |f_1^n|^2 \times \sigma^2} = \frac{|f_1^n h_1^n|^2}{|f_1^n h_2^n|^2 + |f_1^n|^2 \times \frac{2}{SNR}} \quad \text{(Eq. 5)}$$

$$\gamma_2^n = \frac{|f_2^n h_2^n|^2 \times P_2}{|f_2^n h_1^n|^2 \times P_1 + |f_2^n|^2 \times \sigma^2} = \frac{|f_2^n h_2^n|^2}{|f_2^n h_1^n|^2 + |f_2^n|^2 \times \frac{2}{SNR}}$$

Once the post-processing SNR is known, the capacity indicator can be computed in analogy with Eq. 2 and Eq. 3.

$$\frac{C}{W} = \frac{1}{N} \sum_{n=1}^{N} [\log_2(1 + \gamma_1^n) + \log_2(1 + \gamma_2^n)] \quad \text{(Eq. 6)}$$

Discrete Channel Model

As explained, packet error events in a specific mode can be "predicted" by comparing a capacity indicator to the spectral efficiency without direct dependency to the channel realization and SNR. Moreover, as previously mentioned (see [0035]), the capacity indicator can be split into a first term proportional to the SNR in dB and a second term only depending on the channel realization H. The latter observation allows establishing a more abstract channel model.

Figure 4:
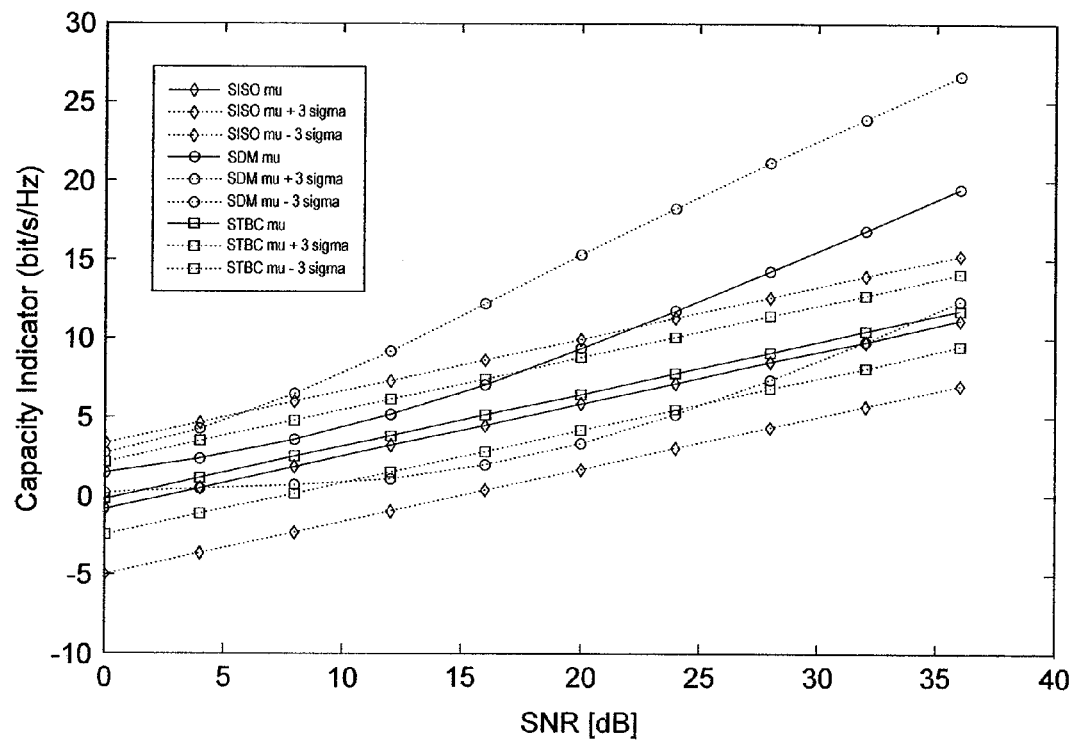
FIG. 4 represents the capacity indicator mean and standard deviation as a function of the SNR for the various modes.

Consider for instance the second term of the capacity indicator in the SISO case. The values of the carrier fading channels $h^n_{ua}$ are typically Rayleigh-distributed. However, due to the averaging across the carriers, the distribution of the second term of the capacity tends to a normal distribution (central-limit theorem). Since the first term of the capacity indicator is independent of H and therefore non-stochastic, the capacity indicator is then also normally distributed. The average and variance of the capacity indicator for a given mode are denoted $\mu_{mode}$ and $\sigma^2_{mode}$, respectively. These quantities only depend on the SNR. Their relation is plotted for the different modes in FIG. 4. Clearly, for a given mode and a SNR sufficiently large, $\mu_{mode}$ grows linearly with SNR in dB while $\sigma^2_{mode}$ stays sensibly constant. The parameters of a corresponding linear model are summarized in Table 1.

TABLE 1

| | $\mu = A \times SNR + B$ | | |
|---|---|---|---|
| | A | B | σ |
| SISO | 0.33 | −0.84 | 1.41 |
| SDM | 0.6 | −2.54 | 2.41 |
| STBC | 0.33 | −0.24 | 0.73 |

Figure 5:
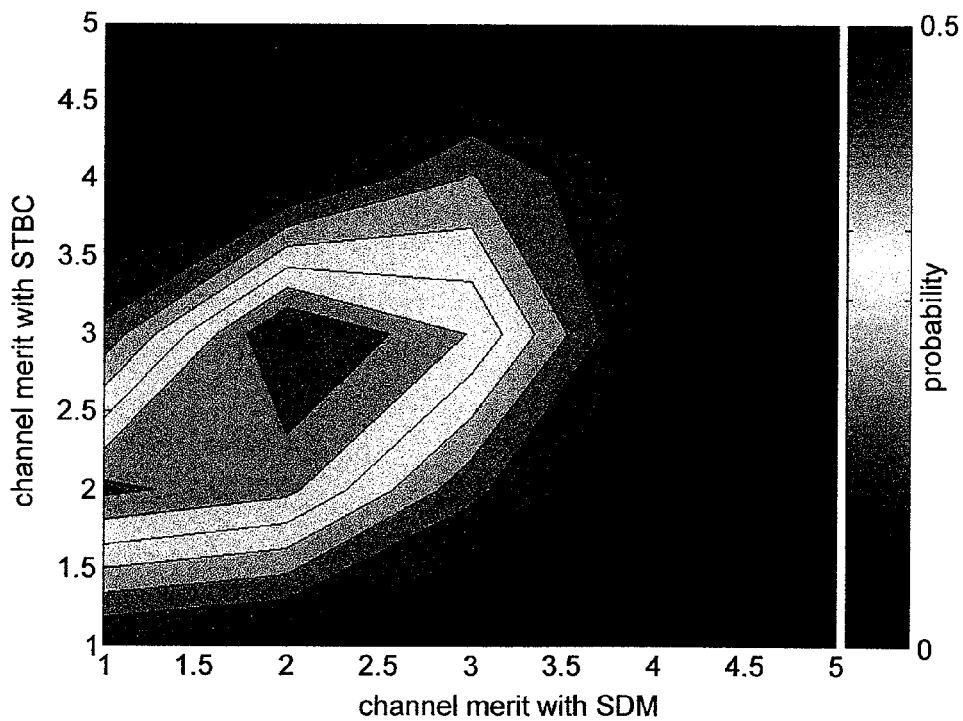
FIG. 5 represents the channel merit joint distribution for STBC and SDM.

To set up the discrete channel model, a channel merit scale is defined for each MIMO mode. Five channel merit classes are defined relative to the average and standard deviation of the capacity indicator for the corresponding average SNR. The channel merits for different MIMO modes are shown weakly correlated (FIG. 5): there exists a significant probability that a channel, which is good for one mode, it is bad for another. This is the key observation motivating the development of an adaptive radio link control scheme that can switch between different MIMO modes.

Goodput Calculation

Assuming the channel capacity criterion is met and, hence, the PER is close to zero, knowing the physical layer throughput ($R_{phy}$) and the details of the protocols, the goodput ($R_{net}$) can be computed (Eq. 7). With goodput is meant the net data rate on top of the data link layer.

$$R_{net} \cong \frac{L_d}{T_{DIFS} + 3 \cdot T_{SIFS} + T_{CW} + \frac{L_d + L_h}{R^d_{phy}} + 4 \cdot T_{plcp} + \frac{L_{ctrl}}{R^b_{phy}}} \quad \text{(Eq. 7)}$$

To better understand this expression, it is to be noted that the denominator corresponds to the total time required for the transmission of one packet of data size $L_d$ with $L_h$-bit header. According to the 802.11 DCF protocol, this transmission requires the exchange of a RTS and a CTS frame separated by a so-called short inter-frame space (SIFS) time ($T_{SIFS}$). Then, the actual data frame can be sent at rate $R^d_{phy}$. Finally, after one more SIFS time, the burst must be acknowledged (ACK). $L_{ctrl}$ corresponds to the aggregate length of all control frames (RTS, CTS and ACK). Each frame is preceded by a so-called PLCP: $L_{plcp}$ bits carrying service information such as the MIMO mode, the modulation order ($N_{mod}$) and code rate ($R_c$) used to encode the data. The PLCPs and the control frames are transmitted in SISO at a so-called basic rate ($R^b_{phy}$) corresponding to $N_{mod}=1$ and $R_c=\frac{1}{2}$. $T_{DIFS}$ is the minimum carrier sense duration required by the CSMA/CA procedure before starting a transmission and $T_{CW}$ holds for the average contention time. The physical layer data rate $R^d_{phy}$ can be expressed as a function of $N_{mod}$ and $R_c$, considering the number of data carrier per OFDM symbol (N) and the symbol rate ($R_s$) and the number of streams U. If U>1, one of the four $T_{PLCP}$ must be replaced by $T_{PLCP\_MIMO}$ in Eq. 7, $T_{CC\_Seq}$ equals 8 μs.

$$R_{phy}{}^d = U.N.N_{mod}.R_c.R_s \quad \text{(Eq. 8)}$$

$$T_{PLCP\_MIMO} = T_{PLCP\_SISO} + (U-1) \times T_{CC\_Seq} \quad \text{(Eq. 9)}$$

Energy Per Bit Calculation

From the aforementioned performance model, one can compute the minimum required SiNAD$_{RX}$, and the corresponding goodput for each MIMO—signaling mode. To compute the associated energy efficiency, one still has to assess the system power consumption needed to sustain the required SiNAD$_{Rx}$. The latter consists of a fixed term due to the electronics, and a variable term, which is a function of the power consumption:

$$P_{system} = P_{elec} + \frac{P_{Tx}}{\eta} \quad \text{(Eq. 10)}$$

$\eta = P_{Tx}/P_{PA}$ denotes the power efficiency of the transmitter power amplifier (PA). In an OFDM transmitter, typically, class A amplifiers are used. The power consumption of a class A amplifier only depends on its maximum output power ($P_{max}$) (Eq. 12). Next, still for OFDM transmitters, the transmitter signal to distortion ratio (S/D$_{Tx}$) can be expressed as a function of the sole backoff (OBO) of the actual power amplifier output power ($P_{Tx}$) to $P_{max}$[18]:

$$P_{PA} = \frac{P_{max}}{2} \quad \text{(Eq. 11)}$$

$$OBO = \frac{P_{max}}{P_{Tx}} \quad \text{(Eq. 12)}$$

The path loss being known, SiNADR, can then be computed as a function of OBO and $P_{Tx}$ by a simple link budget:

$$\frac{1}{SiNAD_{RX}} = \frac{1}{(S/D)_{Tx}} + \frac{P_N \times P_L}{P_{Tx}} \quad \text{(Eq. 13)}$$

$$P_N = k \cdot T \cdot W \cdot N_f \quad \text{(Eq. 14)}$$

where T denotes the temperature, W the bandwidth and N$_f$ the noise figure. The PA power can be expressed as a function of those two parameters as well and, consequently, also the system power.

$$P_{PA} = 2 \times (P_{Tx} + OBO) \quad \text{(Eq. 15)}$$

Finally, the energy efficiency can be computed by dividing the system power by the goodput.

The proposed performance and energy models allow computing the goodput and energy efficiency as a function of the system-level parameters: MIMO and signaling modes, transmit power and power amplifier back-off. In one embodiment, the possible settings considered for those parameters are summarized in Table 2:

TABLE 2

| | |
|---|---|
| MIMO Mode | SISO, SDM2x2, STBC2x2 |
| N$_{mod}$ | BPSK, QPSK, 16QAM, 64QAM |
| R$_c$ | ½, ⅔, ¾ |
| P$_{Tx}$ [dBm] | 0, 5, 10, 15, 20, 23 |
| OBO [dB] | 6, 8, 10, 12, 14 |

Capitalizing on the performance and energy models established above, next to the proposed discrete channel model, it becomes easy to analyze the average rate versus average power trade-off when the system is combined with link adaptation. The trade-off for the STBC and SDM modes is now derived and a comparison is provided with the SISO case. First, for each channel merit, the optimum trade-off is derived between goodput and energy efficiency in terms of energy per useful transmitted bit. This results in Pareto-optimal sets of working points that can be selected by a radio link control policy. The optimal radio link control strategy and the resulting average data rate versus average energy efficiency trade-off are subsequently derived.

Figure 6:
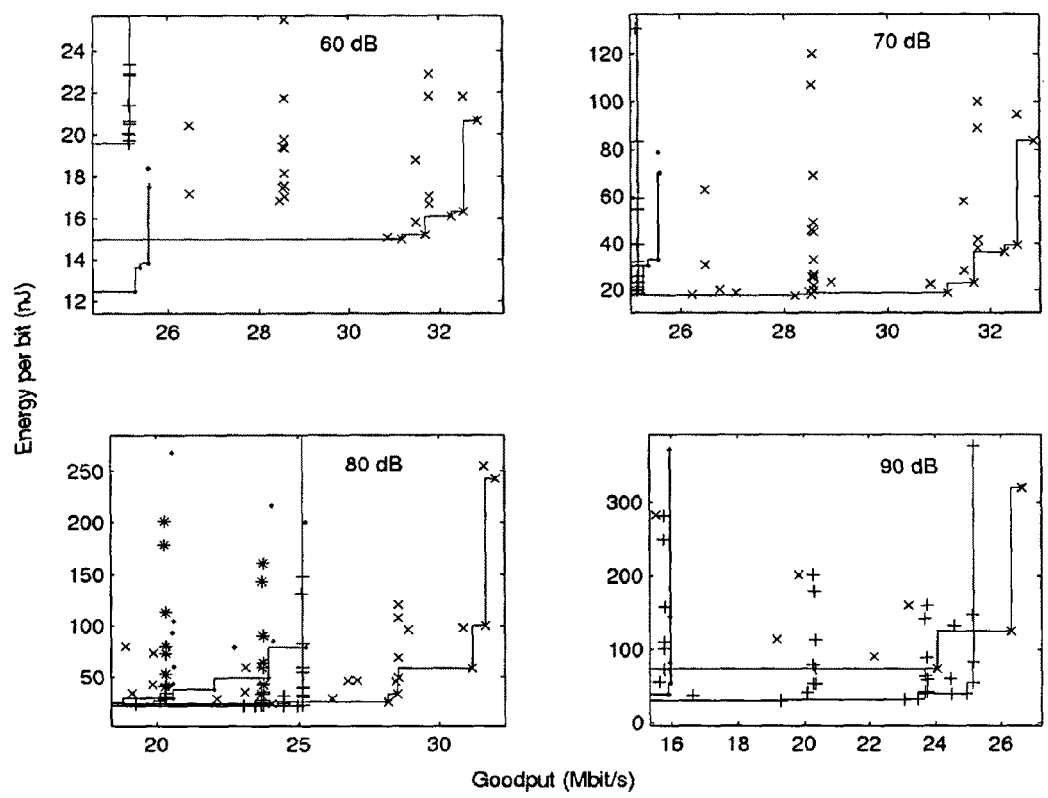
FIG. 6 represents the goodput versus energy per bit trade-off.

To derive the optimal goodput versus energy efficiency trade-off for a given MIMO mode in a given channel state, a multi-objective optimization problem has to be solved: from all system-level parameter combinations, the one bounding the aforementioned trade-off has to be derived. The limited range of the functional parameters still allows proceeding exhaustively to this search. The resulting trade-off points are plotted in FIG. 6. For each mode, only the non-dominated trade-off points are kept, leading to Pareto-optimal sets, which are interpolated by step-curves. Similar trade-off shapes can be observed for the other channel merit values.

From the knowledge of the Pareto-optimal goodput versus energy per bit trade-off and the channel states probabilities and given an average rate constraint, it is easy to derive the link adaptation policy that minimizes the energy per transmitted bit. One is interested in the family of control policies corresponding to R ranging from 0 to R$_{max}$, whereby R$_{max}$ denotes the maximum average rate achievable on the link. This family is called the radio link control strategy. A good approximation of the optimal radio link control strategy (that bounds the trade-off between $\overline{R}$ and $\overline{P}$) can be derived iteratively with a greedy heuristic.

Figure 7:
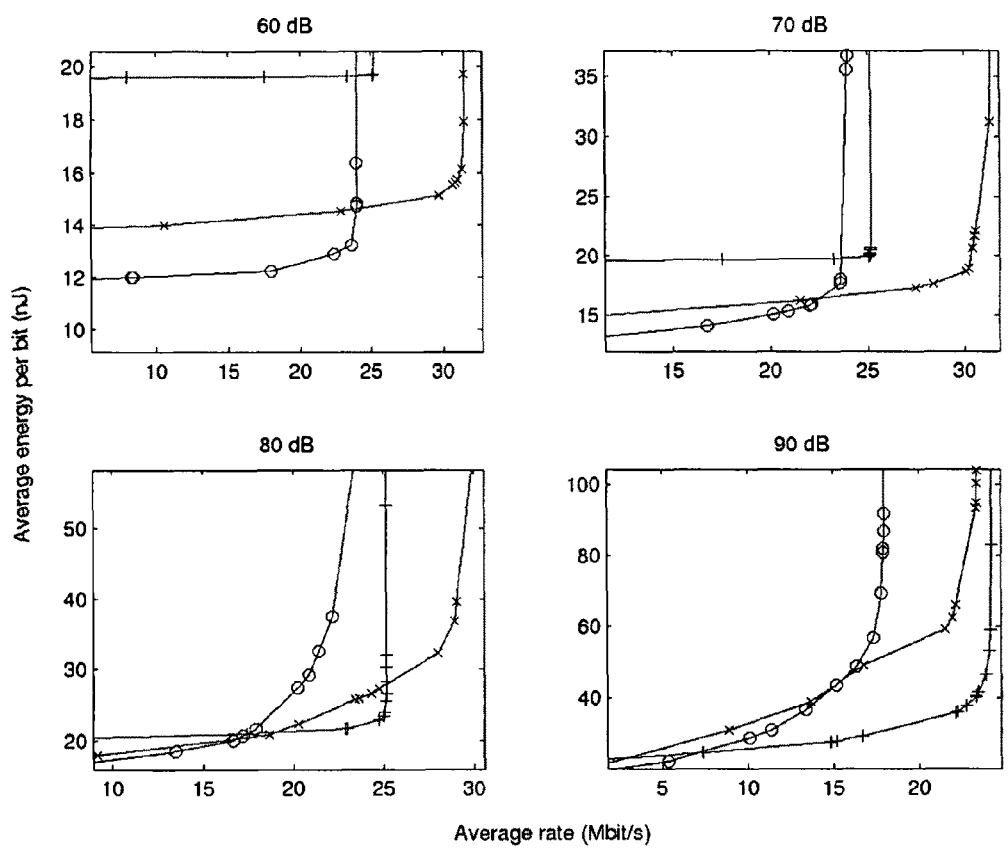
FIG. 7 represents the average rate vs average energy per bit trade-off.

The proposed method is first applied considering the trade-off curves for each mode separately. The obtained resulting average rate versus average energy-per-bit trade-offs are depicted in FIG. 7 for path losses equals to 60, 70, 80 and 90 dB. The results for SDM and STBC are compared with the trade-off achieved with a SISO system. One can observe that for low path loss (60-70 dB), SISO reveals to be the most energy-efficient mode in the whole range it spans. SDM enables however a significant increase of the maximum average rate. STBC is irrelevant in this situation. At average path loss (80 dB), a breakpoint rate (around 15 Mbps) exists above which both SDM and STBC are more energy-efficient than SISO. Above 25 Mbps, SDM is the best mode. At high path loss (90 dB) STBC is the most efficient mode across almost the whole range due to its higher robustness.

In the previous discussion, it was observed that multiple-antenna techniques applied to WLAN (STBC- or SDM-based) allow a significant average rate and/or range extension, but hardly improve the energy efficiency. This is especially true when the average required data rate is lower than 50% of the ergodic capacity of the MIMO channel. However, those results were derived without fully exploiting the potential of the proposed radio link control approaches. Indeed, the merit indexes of a given channel for STBC or SDM are weakly correlated. Channel instances exist that are bad for one mode, but good for the other. Since the energy efficiency of a given mode is obviously better on a well-conditioned channel (with a high merit), an average energy-efficiency improvement can be expected by letting the link adaptation policy select one or the other MIMO mode depending on the channel state. Further, for low link utilization, it is more efficient to use SISO.

Now the average rate versus average energy efficiency is derived achieved by a radio link control strategy that decides jointly about the MIMO mode, the signaling mode and the transmit amplifier configuration.

The Pareto-optimal goodput versus energy per bit trade-off for a given channel state, across all MIMO modes, can be derived in a way similar to what is explained before. The channel state is defined as the triplet of channel merit values in each mode, respectively. The corresponding Pareto trade-off can be derived by combining the single-mode Pareto trade-offs valid for each mode with the corresponding channel merit. Basically, the combined Pareto set corresponds to the subset of non-dominated points in the union of the Pareto sets to be combined. Since a combined Pareto trade-off is valid for a triplet of channel merit, the radio link control policy has to consider 5×5×5=125 channel states. The corresponding 3-dimensional histogram can easily derived through the analysis of a large set of channel instances derived with the IEEE 802.11n channel model.

Figure 8:
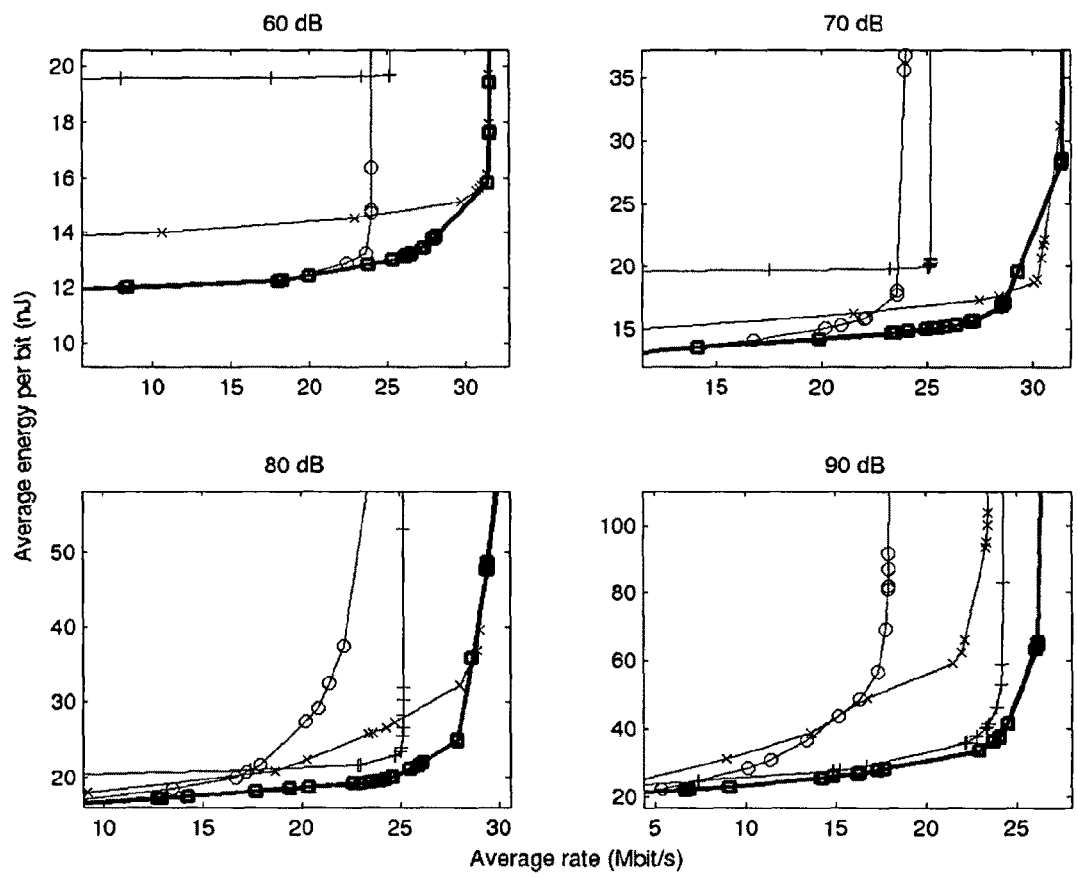
FIG. 8 represents the average rate vs average energy per bit trade-off obtained with the adaptive method according to one embodiment, superposed on the results shown in FIG. 7.

Based on the new Pareto trade-offs per channel state, an improved radio link control strategy can be derived by the method according to one embodiment. The resulting average rate versus average energy per bit trade-off is depicted in FIG. 8, for different path loss. An average power reduction up to 40% can be observed when compared with single-mode MIMO. The resulting rate-power trade-off even dominates the SISO one in the whole range, meaning that the method of one embodiment brings a better energy efficiency than any single mode; this, in the whole range of utilization. Moreover, this improvement does not affect the maximum data rate extension and the range extension provided respectively by SDM and STBC. The energy benefit comes from a better adaptation of the transmission scheme to the channel characteristics thank to the extra "degree of freedom" that the radio link control policy can handle.

In summary the above-described method applies an adaptive medium access and radio link control, which next to the modulation and code rate, decides on using either space-division multiplexing or space-time coding to transmit a given packet on a given channel. The decision rule is set to maximize the energy efficiency, looking at the total power consumption of the transceiver. The proposed solution improves the energy efficiency by up to 40% when compared to non-adaptive multiple antenna techniques while the average rate is improved by more than 50% when compared to single-antenna transmission.

Figure 9:
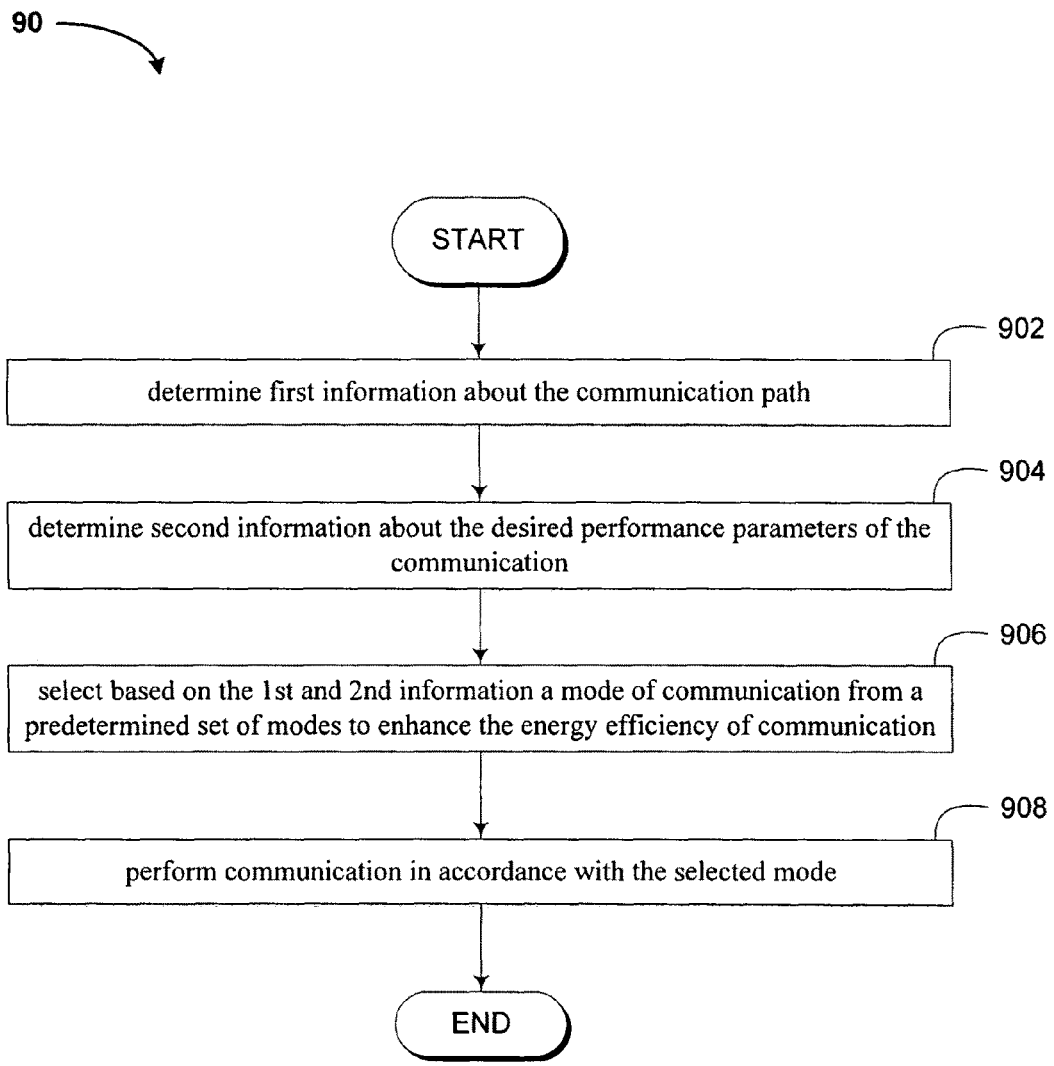
FIG. 9 is a flowchart of one embodiment of a method of performing communication between a transmitting device and a receiving device along a communication path.

FIG. 9 is a flowchart of one embodiment of a method of performing communication between a transmitting device and a receiving device along a communication path. The method may be performed in a system where the transmitting device and the receiving device each have at least one antenna and wherein at least one of the devices has a plurality of antennas. The exemplary method 90 may be performed on, for example, a transmitting device, a receiving device, or a processor or controller controlling the communication. Depending on the embodiment, the process to be carried out in certain blocks of the method may be removed, merged together, or rearranged in order. The general principle of the exemplary method will be described as below.

The method begins at a block 902, where first information about the communication path is determined. The first information may be determined by, e.g., using a capacity indicator capable of computing an instantaneous capacity. Next at a block 904, second information about the desired performance parameters of the communication is determined.

Moving to a block 906, a mode of communication is selected from, e.g., a predetermined set of modes based on the first and second information in order to enhance the energy efficiency of communication. In one embodiment, the set includes at least a Single Input Single Output (SISO) and one Multiple Input Multiple Output (MIMO) communication scheme.

Lastly, at a block 908, the communication is performed in accordance with the selected mode.

Optionally, a block may be added between the block 906 and 908, wherein information about the selected mode of communication is exchanged between the transmitting and receiving device about the determined mode.

The method as described above may be incorporated in a communication system. In one embodiment, the communication system comprises a transmitting device. The system further comprises a receiving device. The system further comprises a communication path between the transmitting device and the receiving device, wherein the transmit device and the receive device having each at least one antenna, at least one of the devices having a plurality of antennas. The transmitting device and the receiving device are configured to a) determine first information about the communication path by using a capacity indicator capable of computing an instantaneous capacity, b) determine second information about the desired performance parameters of the communication, c) select based on the first and second information a mode of communication from a predetermined set of communication modes in order to enhance the energy efficiency of communication, the set comprising a Single Input Single Output (SISO) and at least one Multiple Input Multiple Output (MIMO) communication scheme, d) exchange information about the selected mode of communication between the transmitting and receiving device about the determined mode, and e) perform communication in accordance with the selected mode.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of performing communication between a transmitting device and a receiving device along a communication path, the transmitting device and the receiving device each having at least one antenna, at least one of the devices having a plurality of antennas, the method comprising:

determining first information about the communication path by computing an instantaneous capacity of the communication path;

determining second information about the desired performance parameters of the communication;

selecting based on the first and second information a mode of communication having an enhanced energy efficiency in terms of energy per transmitted bit from a predetermined set of communication modes, the set comprising a Single Input Single Output (SISO) and at least one Multiple Input Multiple Output (MIMO) communication scheme;

exchanging information about the selected mode of communication between the transmitting and receiving device about the determined mode; and performing communication in accordance with the selected mode.

2. The method of claim 1, wherein the selecting of a mode is performed on a subset of the predetermined set, the subset being preselected based on the first and second information.

3. The method of claim 1, wherein the predetermined set comprises at least two MIMO communication schemes.

4. The method of claim 3, wherein the at least two MIMO communication schemes comprise a spatial division multiplexing scheme and a space-time block coding scheme.

5. The method of claim 1, wherein the selecting of a mode of communication is performed on a packet per packet basis.

6. The method of claim 1, wherein the communication is wireless.

7. The method of claim 1, further comprising, configuring the transmission device and the receiving device according to the selected mode.

8. The method of claim 7, wherein the configuring of the transmission and the receiving device is performed in a SISO communication mode.

9. The method of claim 1, wherein the first information about the communication path relates to the average path loss.

10. The method of claim 1, wherein the second information relates to the energy consumption of the transmit device and/or the receive device, wherein the selecting of a mode of communication is performed on a packet per packet basis.

11. The method of claim 1, wherein the second information relates to the net data transmit rate.

12. The method of claim 1, wherein the information about the selected mode comprises the number of antennas of the transmit device and/or of the receive device.

13. The method of claim 12, wherein the information about the selected mode further comprises data about whether or not a MIMO mode is selected.

14. The method of claim 1, wherein the second information relates to the net data transmit rate, and to the energy consumption of the transmit device and/or the receive device.

15. A system for performing communication between a transmitting device and a receiving device along a communication path, the transmitting device and the receiving device each having at least one antenna, at least one of the devices having a plurality of antennas, the system comprising:

means for determining first information about the communication path by computing an instantaneous capacity of the communication path;

means for determining second information about the desired performance parameters of the communication;

means for selecting based on the first and second information a mode of communication having an enhanced energy efficiency in terms of energy per transmitted bit from a predetermined set of communication modes, the set comprising a Single Input Single Output (SISO) and at least one Multiple Input Multiple Output (MIMO) communication scheme;

means for exchanging information about the selected mode of communication between the transmitting and receiving device about the determined mode; and means for performing communication in accordance with the selected mode.

16. The system of claim 15, wherein the second information relates to the energy consumption of the transmit device and/or the receive device.

17. A communication system, comprising:

a transmitting device;

a receiving device;

wherein the transmitting device and the receiving device each have at least one antenna, at least one of the devices having a plurality of antennas;

and wherein the transmitting device and the receiving device are programmed to:

determine first information about the communication path by computing an instantaneous capacity of the communication path, determine second information about the desired performance parameters of the communication, select based on the first and second information a mode of communication having an enhanced energy efficiency in terms of energy per transmitted bit from a predetermined set of communication modes, the set comprising a Single Input Single Output (SISO) and at least one Multiple Input Multiple Output (MIMO) communication scheme, exchange information about the selected mode of communication between the transmitting and receiving device about the determined mode, and perform communication in accordance with the selected mode.

18. The communication system of claim 17, wherein the first information about the communication path relates to the average path loss.

19. The communication system of claim 17, wherein the second information relates to the energy consumption of the transmit device and/or the receive device.

20. The communication system of claim 17, wherein the second information relates to the net data transmit rate.

21. The communication system of claim 17, wherein the information about the selected mode comprises the number of antennas of the transmit device and/or of the receive device.

* * * * *